(12) United States Patent
Hong et al.

(10) Patent No.: US 8,227,179 B2
(45) Date of Patent: Jul. 24, 2012

(54) MANUFACTURING CROSS-STRUCTURES OF NANOSTRUCTURES

(75) Inventors: Seunghun Hong, Seoul (KR); Sung Young Park, Seoul (KR); Seon Namgung, Seoul (KR)

(73) Assignee: SNU R&DB Foundation, Seoul (KR)

( * ) Notice: Subject to any disclaimer, the term of this patent is extended or adjusted under 35 U.S.C. 154(b) by 754 days.

(21) Appl. No.: 12/238,306

(22) Filed: Sep. 25, 2008

(65) Prior Publication Data

US 2010/0028814 A1 Feb. 4, 2010

(30) Foreign Application Priority Data

Aug. 4, 2008 (KR) ........................ 10-2008-0075897

(51) Int. Cl.
*G03F 7/00* (2006.01)
(52) U.S. Cl. ........ 430/322; 430/323; 430/324; 430/330; 977/742; 977/762; 977/773
(58) Field of Classification Search ........................ None
See application file for complete search history.

(56) References Cited

U.S. PATENT DOCUMENTS

| | | | |
|---|---|---|---|
| 6,781,166 | B2 | 8/2004 | Lieber et al. |
| 7,164,209 | B1 | 1/2007 | Duan et al. |
| 7,385,295 | B2 | 6/2008 | Son et al. |
| 2002/0014667 | A1 | 2/2002 | Shin et al. |
| 2006/0281306 | A1 | 12/2006 | Gstrein et al. |
| 2008/0044775 | A1 | 2/2008 | Hong et al. |

FOREIGN PATENT DOCUMENTS

| | | |
|---|---|---|
| KR | 10-2007-0069584 A | 7/2007 |
| KR | 10-2007-0112733 A | 11/2007 |
| KR | 1020070112733 | 11/2007 |
| WO | WO 2006/052104 A1 * | 5/2006 |

OTHER PUBLICATIONS

Office Action issued Aug. 31, 2010, in KR Patent Application No. 10-2008-75897.
Notice of Allowance for Chinese Patent Application No. 200810172612.3 dated Nov. 15, 2010.
Notice of Allowance dated May 30, 2011 in KR Application No. 10-2008-0075897.
Im, et al., "Directed-assembly of Single-walled Carbon Nanotubes Using Self-assembled Monolayer Patterns Comprising Conjugated Molecular Wires," *Nanotechnology*, (2006) vol. 17: pp. 3569-3573.
Lewenstein, et al., "High-yield Selective Placement of Carbon Nanotubes on Pre-patterned Electrodes," *NanoLetters*, (2002) vol. 2, Issue (5): pp. 443-446.
Nakagawa, et al., "Controlled Deposition of Silicon Nanowires on Chemically Patterned Substrate by Capillary Force Using a Blade-coating Method," *J. Phys. Chem.*, (2008) vol. 112: pp. 5390-5396.
Rao et al., "Large-scale assembly of carbon nanotubes", Nature, vol. 425, pp. 36-37, Sep. 4, 2003.
Lee et al., "Linker-free directed assembly of high-performance integrated devices based on nanotubes and nanowires", Nature Nanotechnology, vol. 1, pp. 66-71, Oct. 2006.

* cited by examiner

*Primary Examiner* — Daborah Chacko Davis
(74) *Attorney, Agent, or Firm* — Knobbe, Martens, Olson & Bear, LLP

(57) ABSTRACT

Techniques for manufacturing cross-structures of nanostructures, such as nanowires and carbon nanotubes are provided. In one embodiment, a method for manufacturing cross-structures of nanostructures include providing a substrate, patterning a first mask layer on the substrate, adsorbing first nanostructures onto surface regions of the substrate where the first mask layer does not exist, removing the first mask layer from the substrate, patterning a second mask layer on the substrate to which the first nanostructures are adsorbed, and adsorbing second nanostructures onto the surface regions of the substrate where the second mask layer does not exist, under conditions effective to manufacture cross-structures of nanostructures on the substrate.

20 Claims, 5 Drawing Sheets

MANUFACTURING CROSS-STRUCTURES OF NANOSTRUCTURES

BACKGROUND

During the past several decades, there has been a nearly constant exponential growth in the capabilities of silicon-based microelectronics. The prediction by Gordon E. Moore, the co-founder of Intel Corporation, that the number of transistors that could be fit on a computer chip would double every 18 months has proved true, and there has been a dramatic decrease in the size of electronic elements. However, it is unlikely that these advances will continue much into the next decade due to fundamental physical limitations which prevent current designs from functioning reliably at a nanometer scale, as well as economic limitations such as high fabrication costs.

Recently, nanotechnology has gained tremendous attention because of its potential to overcome the limitations of silicon-based technology. For example, various nano-scale devices based on carbon nanotubes and/or nanowires, which have interesting electrical and/or optical properties, have been developed. In addition, nanoelectronic devices, such as PN diodes and light emitting diodes, based on cross-structures of nanostructures, such as carbon nanotubes and nanowires, have been reported. However, it is extremely difficult to mass-produce cross-structures of nanostructures.

SUMMARY

Techniques for manufacturing cross-structures of nanostructures are disclosed herein. In one embodiment, a method for manufacturing cross-structures of nanostructures includes providing a substrate, patterning a first mask layer on the substrate, adsorbing first nanostructures onto surface regions of the substrate where the first mask layer does not exist, removing the first mask layer from the substrate, patterning a second mask layer on the substrate on which the first nanostructures are assembled, and adsorbing second nanostructures onto surface regions of the substrate where the second mask layer does not exist, under conditions effective to manufacture cross-structures of nanostructures on the substrate.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
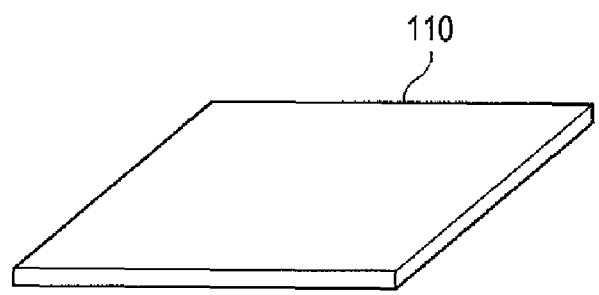
FIGS. 1A-1F are schematic diagrams illustrating the process for manufacturing cross-structures of nanostructures in accordance with one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

Referring to FIGS. 1A-1F, one embodiment of a method for manufacturing cross-structures of nanostructures is illustrated. As illustrated in FIG. 1A, a substrate 110, on which the cross-structures are to be assembled, is provided. By way of example, but not limitation, the substrate 110 may include gold, silicon dioxide, glass, quartz, silicon, and aluminum.

Figure 1B:
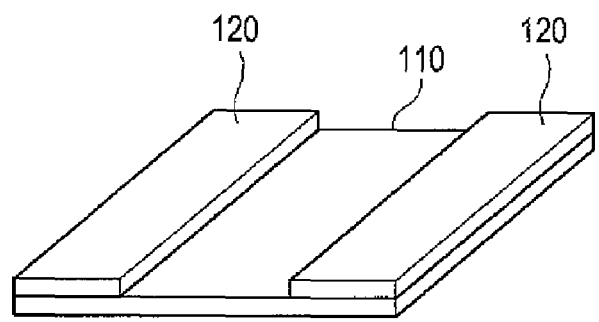

Next, as illustrated in FIG. 1B, a first mask layer 120 is patterned onto the surface of the substrate 110. In one embodiment, the first mask layer 120 may include a photoresist material. In some embodiments, the first mask layer 120 may be patterned onto the surface of the substrate 110 by a conventional photolithography method which may involve a photoresist spin-coating step, a soft/hard-baking step, a UV exposure step using photomask, and a developing step to remove the unmasked photoresist. In addition to the photolithography method, other methods may also be used as long as it results in the first mask layer 120 remaining on the substrate 110, as illustrated in FIG. 1B. Suitable examples for the photoresist material include, but are not limited to, AZ5214E, PMMA (polymethyl-methacrylate), etc.

Figure 1C:
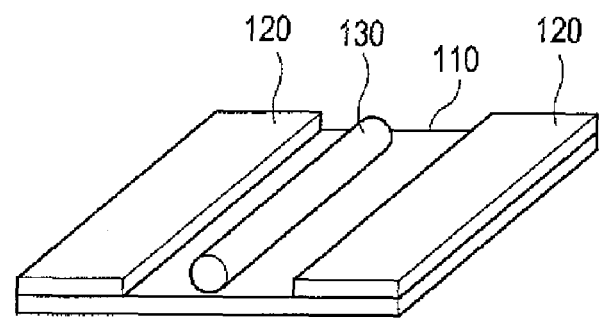

Then, as illustrated in FIG. 1C, first nanostructures 130 are adsorbed onto the surface of the substrate 110. In one embodiment, the first nanostructures 130 may include carbon nanotubes. In another embodiment, the first nanostructures 130 may include nanowires. The nanowires may include any conductive or semiconductive wires having diameters in the order of nanometers.

In one embodiment, the substrate 110 patterned with the first mask layer 120 may be placed in a solution containing the first nanostructures 130, where the first nanostructures 130 in the solution may be adsorbed selectively onto the surface regions of the substrate 110 where the first mask layer 120 does not exist. In another embodiment, the solution containing the first nanostructures 130 may contain predetermined nanostructures immersed in a solvent capable of easily dispersing the predetermined nanostructures. The process of adsorbing the first nanostructures 130 using the solution of nanostructures will be described below in more detail by referring to FIG. 3.

Figure 1D:
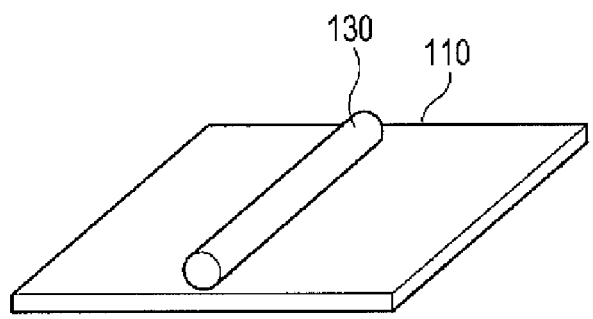

Next, as illustrated in FIG. 1D, the first mask layer 120 is removed from the substrate 110. In one embodiment, the first mask layer 120 may be removed by acetone, or any other solvent that can be used as an etchant. The removal of the first mask layer 120 results in an assembly of first nanostructures 130 on the substrate 110.

Figure 1E:
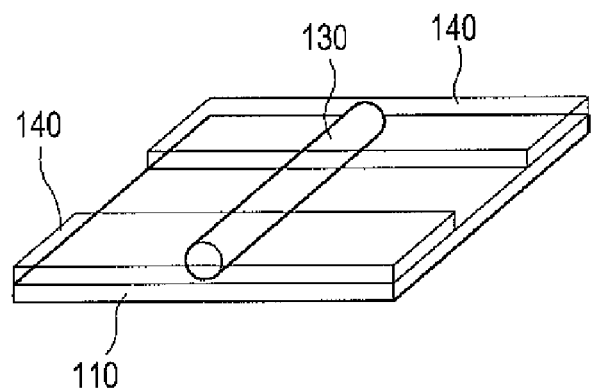

Then, as illustrated in FIG. 1E, a second mask layer 140 is patterned onto the surface of the substrate 110 on which the first nanostructures 130 are assembled. The second mask layer 140 may be patterned so as to leave space for second nanostructures 150 to be adsorbed. In one embodiment, the second mask layer 140 may include a photoresist layer. In another embodiment, the second mask layer 140 may include a hydrophobic molecular layer. The hydrophobic molecular layer may enhance the alignment characteristics of the second nanostructures 150.

In one embodiment, the second mask layer may be patterned by a molecular patterning method. In one embodiment, the molecular patterning method may include a direct molecular patterning method, such as, for example, dip-pen nanolithography and microcontact printing methods. In another embodiment, the molecular patterning method may be carried out by a photolithography method. In one embodiment, the molecular patterning via photolithography may use conventional microfabrication facilities. One embodiment of the molecular patterning process via photolithography will be described below in more detail by referring to FIGS. 2A to 2(E).

Figure 2A:
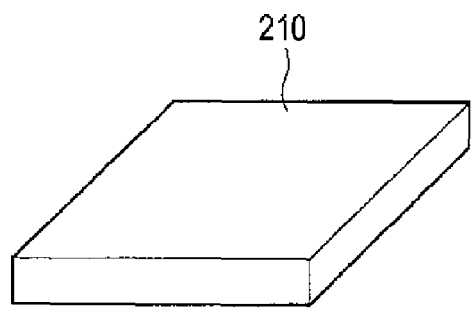
FIGS. 2A-2E are schematic diagrams illustrating the process for molecular patterning via photolithography in accordance with another embodiment.
Figure 2B:
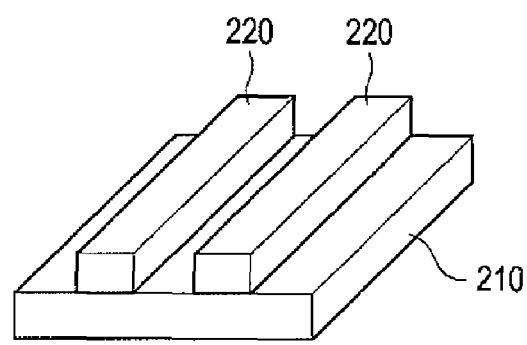

As illustrated in FIGS. 2A and 2B, a photoresist layer 220 is patterned on the surface of a substrate 210. In one embodiment, the photoresist patterning may be carried out with a short baking time, e.g., less than 10 minutes at a temperature of 95° C. The short baking time allows the photoresist layer 220 to be completely removed later without any residue on the surface of the substrate after molecular deposition.

Figure 2C:
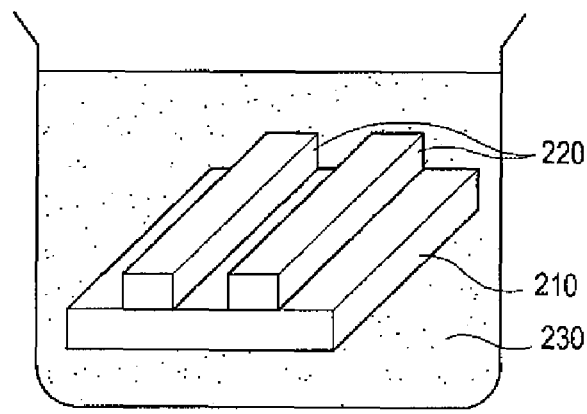

Next, as illustrated in FIG. 2C, the patterned substrate may be rinsed with an anhydrous material 230. By way of example, but not limitation, the anhydrous material 230 may include anhydrous hexane and the like. Such rinsing may remove residual surface water on the substrate.

Figure 2D:
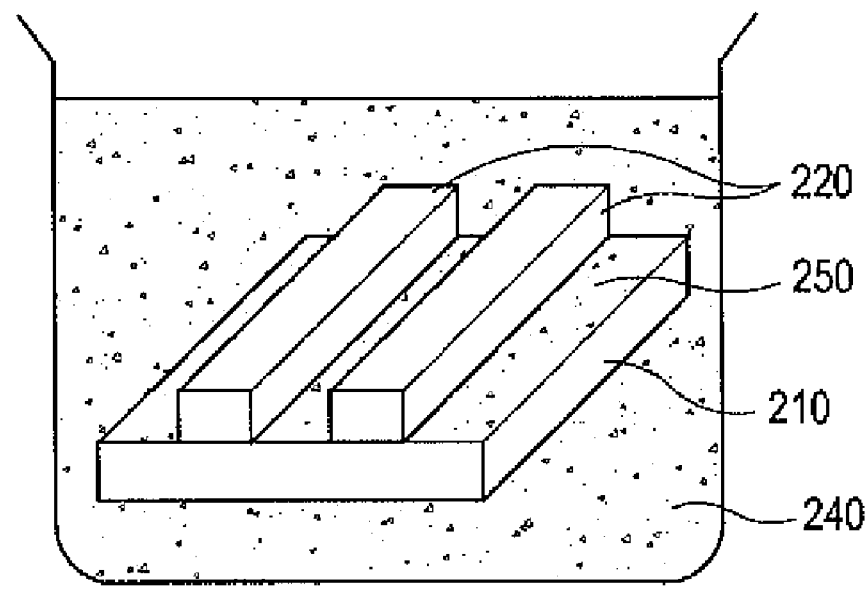

Then, as illustrated in FIG. 2D, the rinsed substrate is placed in a solution 240 containing material for a second mask layer, such as a self-assembled monolayer (SAM). By way of example, but not limitation, the material for SAM may include 1-octadecanethiol (ODT) or octadecyltrichlorosilane (OTS). Then, the material for SAM may be deposited selectively onto the surface regions of the substrate where the photoresist layer 220 does not exist to form a SAM pattern 250 on the substrate 210.

Figure 1F:
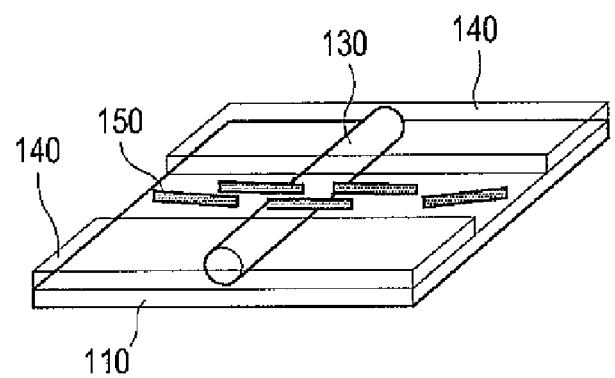
Figure 2E:
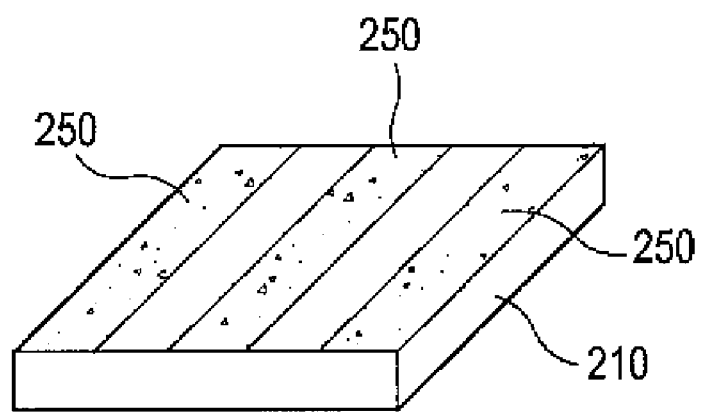

Next, as illustrated in FIG. 2E, the photoresist layer 220 is removed to obtain a substrate 210 having the SAM pattern 250. By way of example, but not limitation, the photoresist layer 220 may be removed by a solvent, such as acetone. The regions where the photoresist existed before being removed may have the same state of the surface of the substrate 210 prior to the molecular patterning, while the SAM pattern 250 may form on the regions where the photoresist does not exist. In one embodiment, the SAM pattern 250 may act as the second mask 140 illustrated in FIGS. 1E and 1F.

Referring back to FIG. 1, as illustrated in FIG. 1F, the second nanostructures 150 are adsorbed onto the surface of the substrate patterned with the second mask 140. In one embodiment, the second nanostructures 150 may include carbon nanotubes. In another embodiment, the second nanostructures 150 may include nanowires.

In one embodiment, the substrate 110 patterned with the second mask layer 140 may be placed in a solution containing the second nanostructures 150, where the second nanostructures 150 in the solution may be adsorbed selectively onto the surface regions of the patterned substrate where the second mask layer 140 does not exist. In one embodiment, the second nanostructures 150 may be spontaneously adsorbed onto the surface regions of the patterned substrate where the second mask layer does not exist, due to the polarity of the surface region. The adsorption of the second nanostructures may result in cross-structures of the first and second nanostructures, as illustrated in FIG. 1F. The molecular linker-free assembly method described above allows the mass-production of cross-structures of nanostructures. The process of adsorbing the second nanostructures using the solution of nanostructures will be described in more detail below by referring to FIG. 3 below.

Figure 3:
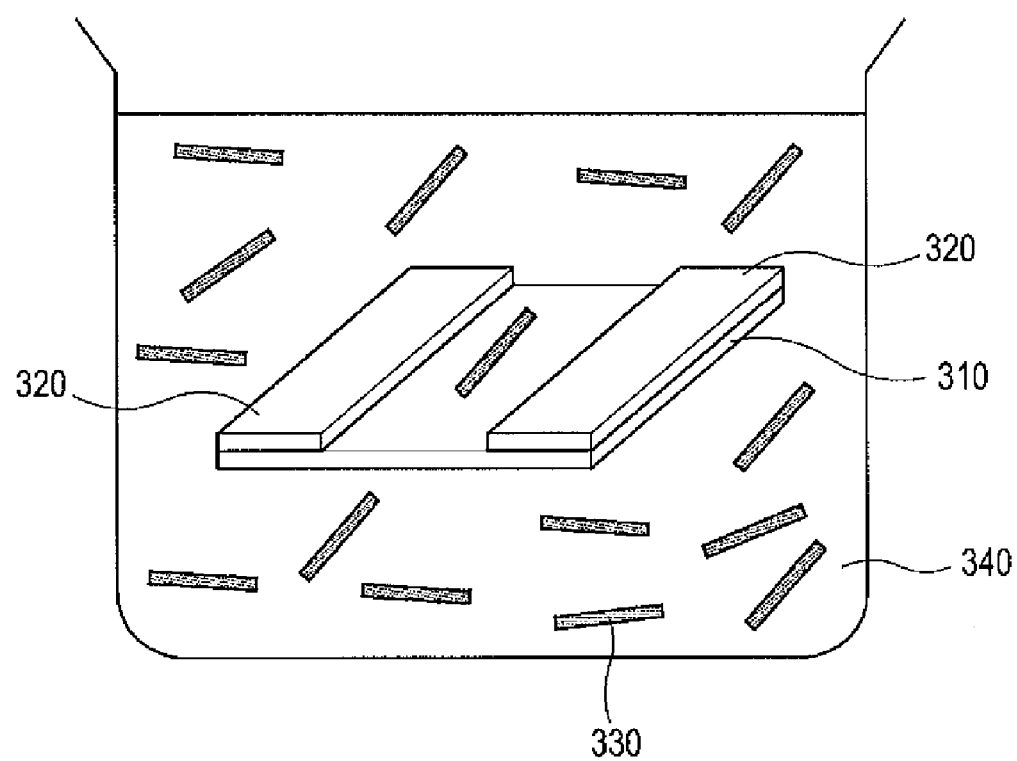
FIG. 3 is a schematic diagram illustrating the process for adsorbing nanostructures onto a substrate in accordance with another embodiment.

FIG. 3 is a schematic diagram illustrating one embodiment of a process for adsorbing nanostructures onto a substrate. By way of example, but not limitation, the nanostructures may include nanowires and carbon nanotubes. As shown in FIG. 3, a substrate 310 with a mask layer 320 may be placed in a solution 340 containing nanostructures 330, where the nanostructures 330 in the solution 340 may be adsorbed selectively onto surface regions of the substrate 310 where the mask layer 320 does not exist. The solvent in the solution containing the nanostructures 330 does not dissolve the mask layer 320.

In one embodiment, the nanostructures 330 may be immersed in a solvent capable of easily dispersing the nanostructures 330. By way of example, but not limitation, in cases when the nanostructures 330 are vanadium oxide ($V_2O_5$) nanowires, deionized water may be employed as a solvent, while in cases when the nanostructures are zinc oxide (ZnO) nanowires, ethanol or deionized water may be employed as a solvent. By way of example, but not limitation, if the nanostructures 330 are carbon nanotubes, 1,2-dichlorobenzene, 1,3,4-trichlorobenzene, 1,3-dichlorobenzene, dichloroethane, chlorobenzene, or the like may be employed as a solvent.

The adsorption of nanostructures 330 onto the patterned substrate may depend on various factors, such as charges on the nanostructures and van der Waals interactions. In one embodiment, the nanostructures 330 may be spontaneously adsorbed onto the surface of the substrate 310, due to the polarity of the surface region. In another embodiment, the nanostructures 330 may be adsorbed onto the surface of the substrate 310, where an electric potential may be used to further enhance the nanostructure adsorption. The electric potential may be applied to the substrate 310 so as to control the degree and/or amount of the adsorption of the nanostructures 330.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for manufacturing cross-structures of nanostructures comprising:
   providing a substrate;
   patterning a first mask layer on the substrate;
   adsorbing first nanostructures onto the substrate having the first mask layer, wherein the first nanostructure are adsorbed onto first exposed regions of the substrate unmasked by the first mask layer;
   removing the first mask layer from the substrate having the first nanostructures adsorbed onto the first exposed regions of the substrate unmasked by the first mask layer;
   patterning a second mask layer on the substrate after the removing of the first mask layer; and
   adsorbing second nanostructures onto the substrate having the second mask layer, wherein the second nanostructures are adsorbed onto second exposed regions of the substrate unmasked by the second mask layer, and wherein the second nanostructures are adsorbed under conditions effective to manufacture cross-structures of nanostructures.

2. The method of claim 1, wherein the first nanostructures are nanowires.

3. The method of claim 1, wherein the first nanostructures are carbon nanotubes.

4. The method of claim 1, wherein the second nanostructures are nanowires.

5. The method of claim 1, wherein the second nanostructures are carbon nanotubes.

6. The method of claim 1, wherein the patterning the first mask layer is carried out by a photolithography method.

7. The method of claim 6, wherein the first mask layer comprises photoresist material.

8. The method of claim 1, wherein the adsorbing the first nanostructures comprises placing the substrate having the first mask layer in a solution containing the first nanostructures.

9. The method of claim 8, wherein the adsorbing first nanostructures further comprises applying an electric potential to the substrate.

10. The method of claim 1, wherein the patterning the second mask layer is carried out by a molecular patterning method selected from the group consisting of photolithography, dip-pen nanolithography, and microcontact printing.

11. The method of claim 10, wherein the patterning the second mask layer is carried out by photolithography.

12. The method of claim 11, wherein the patterning the second mask layer comprises:
    patterning a photoresist layer on the substrate after the removing of the first mask layer;
    placing the substrate having the photoresist layer in a solution containing material for the second mask layer under conditions effective to deposit the second mask layer onto a third exposed regions of the substrate unmasked by the photoresist layer; and
    removing the photoresist layer from the substrate.

13. The method of claim 12, wherein the patterning the second mask layer further comprises:
    rinsing the substrate having the photoresist layer with an anhydrous material before the placing of the substrate in the solution containing material for the second mask layer.

14. The method of claim 12, wherein the patterning the photoresist layer is carried out with a baking time of less than 10 minutes.

15. The method of claim 12, wherein the placing the substrate comprises placing the substrate in a solution including a compound selected from the group consisting of 1-octadecanethiol (ODT) and octadecyltrichlorosilane (OTS).

16. The method of claim 1, wherein the patterning the second mask layer comprises patterning a hydrophobic molecular layer.

17. The method of claim 1, wherein the patterning the second mask layer comprises patterning a self-assembled monolayer.

18. The method of claim 1, wherein the adsorbing the second nanostructures comprises placing the substrate having the second mask layer in a solution containing the second nanostructures.

19. The method of claim 18, wherein the adsorbing of the second nanostructures further comprises applying an electric potential to the substrate.

20. A method comprising:
    selectively applying a photoresist to a substrate;
    applying first nanostructures to unmasked regions of the substrate where the photoresist does not exist, wherein the first nanostructures are applied after selectively applying the photoresist to the substrate;
    removing the photoresist pattern after the applying of the first nanostructures to expose a surface of the substrate where the first nanostructures are not applied;
    selectively applying a mask layer to the substrate after the removing of the photoresist pattern; and
    applying second nanostructures to exposed regions of the substrate where the mask layer does not exist, wherein the second nanostructures are applied after the selectively applying of the mask layer to the substrate.

* * * * *